United States Patent
Casari et al.

(10) Patent No.: US 10,634,486 B2
(45) Date of Patent: Apr. 28, 2020

(54) DEVICE FOR MEASURING ENDOGENOUS DEFORMATIONS

(71) Applicants: CENTRE NATIONAL DE LA RECHERCHE SCIENTIFIQUE—CNRS, Paris (FR); UNIVERSITE DE NANTES, Nantes (FR)

(72) Inventors: Pascal Casari, Saint-Nazaire (FR); Nordine Leklou, Saint-Nazaire (FR); Yves Pouzaint, Nantes (FR); Damaris Rossetti, Saint-Nazaire (FR)

(73) Assignees: Centre National De La Recherche Scientifique—CNRS, Paris (FR); Universite De Nantes, Nantes (FR)

( * ) Notice: Subject to any disclaimer, the term of this patent is extended or adjusted under 35 U.S.C. 154(b) by 0 days.

(21) Appl. No.: 16/097,453

(22) PCT Filed: Apr. 27, 2017

(86) PCT No.: PCT/FR2017/050995
§ 371 (c)(1),
(2) Date: Oct. 29, 2018

(87) PCT Pub. No.: WO2017/187090
PCT Pub. Date: Nov. 2, 2017

(65) Prior Publication Data
US 2019/0154435 A1    May 23, 2019

(30) Foreign Application Priority Data
Apr. 29, 2016  (FR) ..................... 16 53907

(51) Int. Cl.
*G01B 11/16*  (2006.01)
*G01M 5/00*   (2006.01)
*G01M 11/08*  (2006.01)

(52) U.S. Cl.
CPC .......... *G01B 11/18* (2013.01); *G01M 5/0041* (2013.01); *G01M 5/0091* (2013.01); *G01M 11/083* (2013.01)

(58) Field of Classification Search
CPC .... G01B 11/18; G01M 5/0091; G01M 5/0041
See application file for complete search history.

(56) References Cited

U.S. PATENT DOCUMENTS 5,487,307 A * 1/1996 Landgren ................ G01B 7/16
                                                     73/149
6,696,974 B1 * 2/2004 Mathis ................... G01B 11/18
                                                     324/534
(Continued)

FOREIGN PATENT DOCUMENTS

FR    2855210 A1    11/2004
FR    2996634 A1     4/2014
(Continued)

OTHER PUBLICATIONS

International Search Report related to Application No. PCT/FR2017/050995 reported on Aug. 7, 2017.
(Continued)

*Primary Examiner* — Dominic J Bologna
(74) *Attorney, Agent, or Firm* — Miller, Matthias & Hull LLP

(57) ABSTRACT

Device for measuring the endogenous deformations of a structure of materials, during the transition of said structure from a liquid phase to a solid phase, comprising:
- a uniaxial test body suitable for being embedded in the structure;
- a deformation measurement fiber attached to the interior of the test body;
- a system connected to the measurement fiber and suitable for detecting signals representative of the deformations of the measurement fiber and for determining the
(Continued)

endogenous deformations from these signals and from known mechanical properties of the materials of the test body, the test body having a rigidity comprised between 2 and 5 gigapascals.

15 Claims, 5 Drawing Sheets

(56) References Cited

U.S. PATENT DOCUMENTS

| | | | |
|---|---|---|---|
| 2011/0200068 A1* | 8/2011 | Piscsalko | G01K 1/026 374/152 |
| 2016/0202133 A1* | 7/2016 | Francois | G01B 11/18 250/227.14 |

FOREIGN PATENT DOCUMENTS

| | | |
|---|---|---|
| WO | WO 2006127034 A2 | 11/2006 |
| WO | WO 2014140496 A1 | 9/2014 |

OTHER PUBLICATIONS

V. Baroghel-Bouny, et al.: "Effect of Mix-Parameters on Autogenous Deformations of Cement Pastes Microstructural Interpretations", Concrete Science and Engineering, Mar. 1, 2001, vol. 3, pp. 23-38. ISSN 1295-2826/01 RILEM Publications S.A.R.L.

C. Hua, et al.: "Analyses and Models of the Autogenous Shrinkage of Hardening Cement Paste", Cement and Concrete Research, Jul. 6, 1995, vol. 25, No. 7, pp. 1457-1468, Elsevier Science Ltd.

H. K. Lee, et al.: "Autogenous Shrinkage of High-Performance Concrete Containing Fly Ash", Magazine of Concrete Research, Dec. 6, 2003, No. 6, pp. 507-515, [Retrieved on Oct. 25, 2018], ICE Publishing.

* cited by examiner

DEVICE FOR MEASURING ENDOGENOUS DEFORMATIONS

CROSS-REFERENCE TO RELATED APPLICATION

This Application is a 35 USC § 371 US National Stage filing of International Application No. PCT/FR2017/050995 filed on Apr. 27, 2017, and claims priority under the Paris Convention to French Patent Application No. 16 53907 filed on Apr. 29, 2016.

FIELD OF THE DISCLOSURE

The invention relates to a device for measuring endogenous local deformations of a structure during a solidification stage of said structure.

BACKGROUND OF THE DISCLOSURE

Structures that are used very commonly in architecture in civil engineering works such as dams, nuclear power plants, bridges, tunnels, etc., as well as generally in fields related to mechanics, generally undergo mechanical stresses during their construction and throughout their service life. The application of these stresses causes deformations within the volume of these structures which can result in altering their mechanical properties. Autogenous shrinkage, namely shrinkage that originates inside the body of the structure, of the material composing the structure is particularly problematic during creation of the structure, for example during creation of a structure made of cementitious matrices with a low water/cement ratio, and is a cause of premature cracking of the material. Indeed, the capillary pressure generated by self-desiccation can reach very high values (several megapascals (MPa) according to Hua et al., 1995). Several studies have shown that the endogenous shrinkage that occurs during the first day of the solidification phase represents a very significant share of the endogenous deformations of the material over the long term: after the first twenty-four hours, the endogenous deformation can reach over 40% (Baroghel-Bouny and Kheirbek, 2001), or for some high-performance concretes, more than 80% (Lee et al., 2003), of the deformation measured after a year of maturation in endogenous conditions.

To monitor the quality of these structures, it is necessary to be able to measure the evolution of the deformations that occur in these structures during the first few days, between one and four days and preferably during the first three days, of the transition of the material from liquid phase (paste) to solid phase.

The evolution of the deformations of structures and the estimation of the stresses acting on them can be monitored by devices placed on the outer surface of the structures, such as visual indicators for deformations or mechanical sensors sensitive to deformation at the surface of these structures (FR2855210). Deformation measurements within a structure can be estimated by integrating within the volume of the structure a uniaxial sensor or "measurement fiber" such as an optical fiber (WO2006127034). However, at best these methods only allow estimating an average, along the axis of the sensor, of stress or deformation components exerted in a fiber placed in the monitored volume. Finally, direct integration of a sensor into the monitored structure can result in weakening said structure, due to the change in distribution of stresses in the volume of the structure near the sensor, the particular shape of the sensor possibly resulting in local concentrations of stresses conducive to crack initiation around the sensor.

The present invention aims to improve the quality and reliability of the measurement of endogenous deformations occurring locally within a structure. In particular, the present invention aims to improve the quality and reliability of the measurement of endogenous deformations occurring locally within a structure during solidification of the structure.

SUMMARY OF THE DISCLOSURE

For this purpose, a device is provided for measuring the endogenous deformations of a structure during the transition of said structure from a liquid phase to a solid phase, the device comprising:

at least one uniaxial test body extending between a first end and a second end, said at least one test body being suitable for being embedded in the structure and being made of homogeneous flexible material with known mechanical properties, a deformation measurement fiber attached to the interior of at least one test body, such that deformations of the at least one test body are transmitted to the measurement fiber, a system connected to the measurement fiber and suitable for detecting signals from the measurement fiber that are representative of the deformations of the measurement fiber and for determining the endogenous deformations from at least one of the detected signals and from known mechanical properties of the materials of the test body, the at least one test body having a rigidity comprised between 2 and 5 gigapascals (GPa).

Regarding the mechanical properties of the material of the structure itself, these may be theoretical mechanical properties which assume that the material is sound.

This is in reference to the rigidity of the test body, but equivalently it could be in reference to the Young's modulus of the component material of said test body.

Alternatively, this could be in reference to the stresses or strains, provided that the two quantities are related by a law of mechanical behavior.

As for the determined endogenous deformations and stresses, these are the values that would be present in the structure at the level of the measurement, in the absence of the measurement device (in other words if the component material of the structure had not been replaced at that location by the test body), and therefore these same values in the vicinity of the test body.

Thus, the measurement device is unintrusive, inexpensive, and is easy to implement on site.

In addition, a simple measurement device ensures proper positioning and proper orientation of the measurements, during insertion of the measurement device into the material.

In addition, test bodies of low rigidity allow monitoring the evolution in the rigidity of the material throughout its curing phase.

In preferred embodiments of the invention, use may possibly be made of one or more of the following arrangements:

the device further comprises a support with uniaxial legs, the measurement fiber being fixed to the interior of the plurality of legs such that the deformations undergone by the plurality of legs are transmitted to the measurement fiber, the plurality of legs having a rigidity comprised between 2 and 5 gigapascals;

the measurement fiber is an optical measurement fiber; the performance of the measurement fiber is thus improved: transmission distances increased, measurement fiber resistance to unfavorable environments improved, ability to multiplex multiple sensors on a single measurement fiber, etc.;

the at least one test body comprises a channel extending between the first end and the second end, at least a portion of the measurement fiber being glued to the interior of said channel; the risk of the measurement fiber buckling is thus nullified and the measurement fiber is perfectly integral to the test body so as to ensure accurate measurements;

the test body is overmolded on at least a portion of the measurement fiber; the risk of the measurement fiber buckling is thus nullified and the measurement fiber is perfectly integral to the test body so as to ensure accurate measurements;

the at least one test body comprises at least one lug extending radially relative to said test body, between a first end integral to said test body and a second free end; the test body or bodies are thus integral to the structure; more particularly, the arrangement of the one or more lugs improves the connection between the one or more test bodies and the structure, and therefore improves the accuracy of the measurements;

the measurement fiber is equipped with a strain gauge, a Bragg grating, or a Fabry-Perot cavity; thus, the Bragg grating, the strain gauge, or the Fabry-Perot cavity, which are inscribed in or carried by the measurement fiber, allow accurately measuring the microscopic displacements undergone by the test body (any deformation of the structure being transmitted through the test body to the Bragg grating, strain gauge, or Fabry-Perot cavity), such an equipped fiber also being easy to put in place on the test bodies;

said device comprises at least three test bodies arranged in three distinct directions, a first test body extending in a first direction, a second test body extending in a second direction perpendicular to the first direction, and a third test body extending in a third direction perpendicular to the first direction and second direction; the measurement device thus makes it possible to directly measure deformations in three chosen directions, thereby improving the relevance of these measurements;

said device comprises a fourth test body extending in a fourth direction that lies within a first plane comprising the first direction and second direction, and/or a fifth test body extending in a fifth direction that lies within a second plane comprising the second direction and third direction, and/or a sixth test body extending in a sixth direction that lies within a third plane comprising the first direction and third direction; In mechanics, as space is considered to have six dimensions, the measurement device makes it possible to directly measure deformations in these six dimensions;

the device further comprises a support with uniaxial legs, each leg being connected to at least one other leg and said legs defining between them an internal space of substantially cubic shape, wherein the measurement fiber is continuous and runs through each of the legs, and wherein at least one of the legs of the support comprises one of the at least one test body; the particular shape of the support allows inserting the assembly of test bodies into the material while best minimizing the intrusive aspect of these bodies in order to guarantee reliable measurements;

at least three legs among the legs of the support respectively comprise the first test body, the second test body, and the third test body; the relevance of the measurements is thus improved;

at least one leg of the support comprises the fourth test body, and/or at least one leg of the support comprises the fifth test body, and/or at least one leg of the support comprises the sixth test body, each of the legs of the support comprising at most one test body; the relevance of the measurements is thus imp roved;

at least one leg among the legs of the support is equipped with a temperature sensor carried by the measurement fiber; the temperature changes during curing of the materials are important information items that are useful to obtain in order to improve the relevance of the measurements;

the support comprises at least seven legs and the measurement fiber which runs through each of said legs forms a loop; the measurement fiber thus enters and exits at the same level of the support, minimizing the intrusive aspect of the measurement device.

The invention also relates to a mechanical structure comprising a measurement device as described above.

The invention also relates to a method for measuring endogenous deformations of a structure during the transition of said structure from a liquid phase to a solid phase, said method comprising the following steps:

installing a measurement device as described above, pouring the liquid-phase structure around the measurement device, so as to embed the measurement device, collecting measurements on the system from the measurement device during the solidification phase of the structure; it is thus possible to ensure the positioning and orientation of the measurements while being subjected to the phase of pouring materials.

Some implementations also offer the advantages described below.

The device of the invention improves the reliability of the measurement by grouping the measurement means inside a less intrusive and less expensive structure intended to be incorporated within the material for which the evolution is to be monitored; and made of a material ensuring good transmission of the measured values to the detector.

Improving the quality of the measurement is linked to precise local knowledge of deformations in a measurement volume, and therefore requires knowledge of the strain tensor at any point in this volume. The components of the strain tensor can be represented by a 3×3 matrix.

$$\begin{pmatrix} \varepsilon_{11} & \varepsilon_{12} & \varepsilon_{13} \\ \varepsilon_{21} & \varepsilon_{22} & \varepsilon_{23} \\ \varepsilon_{31} & \varepsilon_{32} & \varepsilon_{33} \end{pmatrix}$$

The symmetry of the tensor implies that it can be fully determined from six independent components. It is possible to measure these deformations at several points and for given directions by spreading out multiple uniaxial sensors within the measurement volume. According to one embodiment, by integrating deformation sensors in suitable test bodies, the device of the invention allows measuring values related to the components of the strain tensor within the volume of the inventive device, which is considered to be small compared to that of the structure. The device of the invention incorporating a plurality of test bodies comprising sensors then allows simultaneously measuring multiple values related to the strain tensor. A simultaneous estimation of six independent components of the strain tensor becomes possible by placing, in the support, a minimum of six measurement elements oriented in six spatial directions.

BRIEF DESCRIPTION OF THE DRAWINGS

Other features and advantages of the invention will be apparent from the following description of some embodiments given as non-limiting examples, with reference to the accompanying drawings.

In the drawings.

In the different figures, the same references denote identical or similar elements.

DETAILED DESCRIPTION OF THE DISCLOSURE

Figure 1:
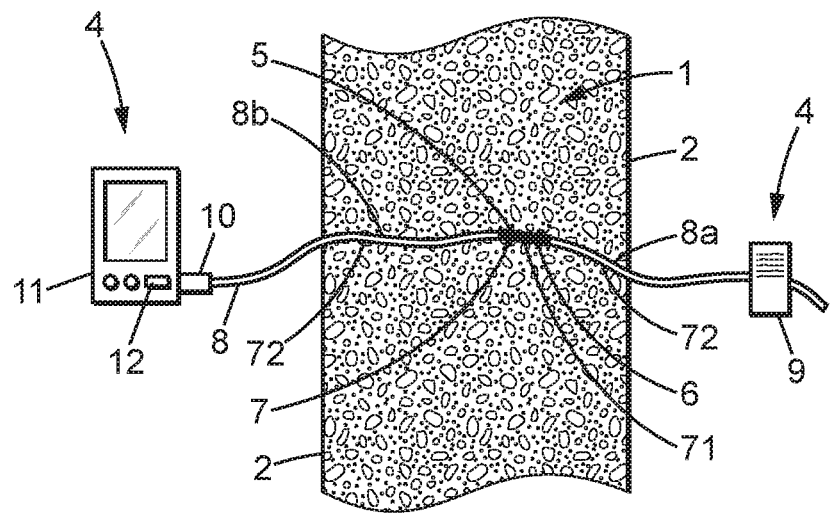
FIG. 1 is a view of a test body placed in a portion of a structure, an optical measurement fiber being placed in a uniaxial test body connected to the exterior of the structure with a means for stimulating the optical measurement fiber and with a means for transmitting signals from the optical measurement fiber to an electronic device capable of performing calculations.

FIG. 1 schematically shows a portion of a structure 1 for which one wishes to determine a deformation of mechanical origin. Preferably, one wishes to determine the mechanical deformations undergone by the structure 1 at a very early age. "Very early age" of the structure refers to the time between the beginning and the end of the solidification phase of the structure 1. The structure 1 is, for example, a rigid structure such as a civil engineering structure, in particular made of concrete, where appropriate hollowed and/or reinforced in places. In the case of a structure 1 consisting of concrete, the solidification step comprises the setting step during which the mixture of components stiffens and begins to strengthen, and the curing step during which the material transitions from a flexible state to a rigid state and acquires its strength.

Alternatively, the structure 1 may be made of polymeric materials such as a resin that will harden over time by drying.

The structure 1 receives at least one test body 5 as will be described below in relation to FIG. 2. Furthermore, an instrumentation area 4 may be installed outside of the structure 1. In the example of FIG. 1, two instrumentation areas 4 are provided.

The measurement device equipping the structure of FIG. 1 comprises a test body 5 placed in a portion of the structure 1. In particular, the outer periphery 18 of the test body 5 is fixed to the inner periphery of the structure 1, so as to transmit to the test body 5 the deformations undergone by the structure 1. The test body 5 is integrally fixed along its entire outer periphery 18 to the structure 1 (except for locations for connection to a measurement fiber 7, as explained below).

Figure 2:
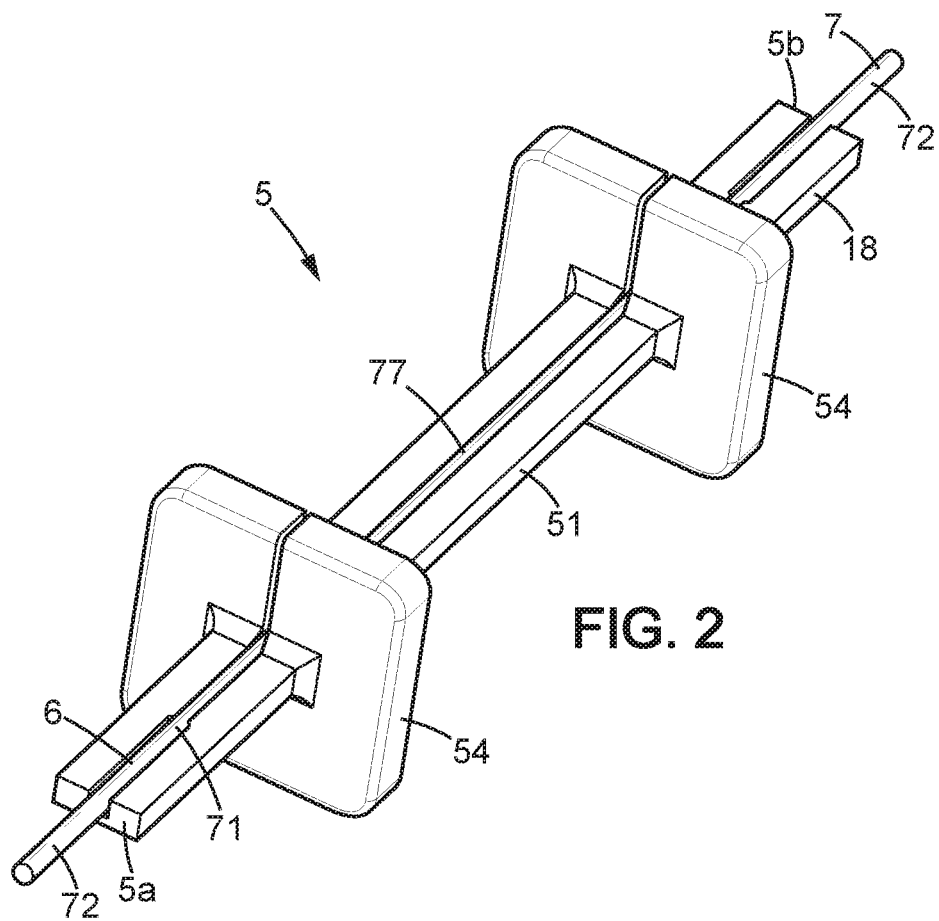
FIG. 2 shows an example of a test body with a measurement fiber.

As can be seen in FIG. 2, a test body 5 may be uniaxial. The test body 5 is composed of a single part. The test body 5 comprises a continuous body 51 extending between a first end 5a and a second end 5b. The test body 5 may be made of a material particularly suitable for the transmission of deformations from the structure 1 to a measurement fiber 7 (which will be described below). It is preferably homogeneous and has no discontinuities. The test body 5 may be made of flexible plastic or of any other flexible materials in order to allow measuring endogenous deformations from the moment the solidification phase begins. In addition, it reduces the risk of weakening the structure 1 due to the formation of cracks. The test body 5 has for example a rigidity comprised between 2 and 5 gigapascals (GPa). The rigidity and dimensions of the test body 5 enable determining a stiffness. The measured stiffness is the axial stiffness of the test body 5. The rigidity criterion of the test body 5 is important because the deformations of the structure 1 are transmitted to said test body 5 and the latter then transmits them to the measurement fiber 7. A rigidity of between 2 and 5 GPa allows the test body 5 to protect the measurement fiber 7 while maintaining a high level of accuracy in the measurements made.

Additional criteria for selecting the material of the test body 5 may be related to durability, toxicity, or cost.

The body 51 of the test body 5 may be pierced by at least one channel 6 which extends longitudinally between the first end 5a and the second end 5b of the test body 5.

Optionally, the test body comprises 5 a flange 54 adapted to improve the anchoring of the test body to the structure 1. The flange 54 extends around the body 51 and may have a substantially circular or substantially square shape. Alternatively, the test body 5 may comprise a second flange 54. Each of the flanges 42 is pierced by the channel 6.

Optionally, the test body 5 may comprise a lug 55 suitable for improving the anchoring of the test body to the structure 1. The lug 55 extends radially to the body 51 of the test body 5, between a first end 55a integral with the body 51 and a second free end 55b. The lug 55 may be straight. Alternatively, the lug 55 may have a curvilinear shape. Optionally, the second end 55b may have a hook shape.

Optionally, the test body 5 may comprise a plurality of lugs 55. The first end 55a of each of the lugs 55 is preferably integral with the first end 5 or second end 5b of the body 51 of the test body 5.

The measurement device comprises a measurement fiber 7 which extends within the channel 6. In particular, a portion 71 of the measurement fiber 7 extends within the channel 6. In addition, at least a portion 71 of the measurement fiber 7 is fixed to the interior of the test body 5, so that the deformations undergone by the test body are transmitted to the measurement fiber 7. For example, the at least one portion 71 of the measurement fiber 7 is glued to the interior of the channel 6. Alternatively, the test body 5 does not comprise a channel 6 and the at least one portion 71 of the measurement fiber 7 is embedded within said test body 5, for example by overmolding the measurement fiber 7 with the test body 5. Such attachment may, for example, be done with slight traction prestressing on the measurement fiber 7 when the test body 5 is at rest, so that the fiber remains taut regardless of the load on the test body 5. The assembly composed of a test body 5 and the measurement fiber 7 has for example a rigidity comprised between 2 and 5 gigapascals (GPa). The rigidity and dimensions of the assembly composed of a test body 5 and the measurement fiber 7 allow determining a stiffness of the assembly. The measured stiffness is the axial stiffness of the assembly. Axial stiffness is understood to mean the stiffness measured along the axis of the measurement fiber 7 embedded in the test body 5.

For example, a continuous optical fiber 8 is provided which extends from the instrumentation area 4 to inside the structure 1 to the channel. 6, inside the channel 6, then inside the structure 1 to the other instrumentation area 4. The optical fiber 8 is, for example, made of silica. The optical fiber 8 may be single-mode or multi-mode.

The at least one portion 71 of the measurement fiber 7 integral with the test body 5 extends rectilinearly within said test body 5, along a given axis direction. In contrast, the portions 72 of the measurement fiber 7 extending between the walls 2 of the structure 1 and the test body 5 extend in any suitable direction, in particular in order to adapt to natural channels of the structure 1.

A measurement device is provided for determining stresses or deformations in the structure 1 at the test body 5. The optical characteristics of at least a portion 71 of the measurement fiber 7 in the test body 5 are dependent on the deformations exerted on it. The at least one portion 71 of the measurement fiber 7 comprises for example an active area 77, for example equidistant from the first end 5a and the second end 5b of the test body 5. The active area 77 may be equidistant from the two flanges 54 of the test body 5.

The active area 77 has an elasto-optical property, in other words its optical transmission depends on its tension along the axis of the fiber 7. More particularly, the active area 77 may be equipped with an optical gauge. The optical gauge is a mechanical deformation sensor based on an interferometer signal included in the single-mode optical fiber 8.

The optical gauge may, for example, be a Bragg grating capable of deforming according to the mechanical stresses exerted on portion 71 of the measurement fiber 7. More particularly, the Bragg grating is implemented by a photoinscribed region on the measurement fiber 7 inside the active area 77 and capable of deforming to follow the deformations of mechanical origin exerted on portion 71 of the measurement fiber 7.

Any deformation of the structure 1 is transmitted to the Bragg grating by means of the test body 5. This Bragg grating then modifies the light it receives from an appropriate stimulation device. This light returns to an acquisition system 10 via the optical fiber 8, and the deformation of the structure 1 is determined by a computing unit 11 based on the light so modified.

Alternatively, the optical gauge equipping the active area 77 may be a strain gauge.

Alternatively, the optical gauge equipping the active area 77 may be a Fabry-Perot cavity.

Optionally, the assembly composed of the test body 5 and the measurement fiber 7 may have a rigidity comprised between 2 and 5 gigapascals. The rigidity and the dimensions of the assembly allow determining a stiffness of the assembly. The measured stiffness is the axial stiffness of the assembly.

Although the present description is given primarily with reference to the embodiment concerning an optical measurement fiber, other measurement fiber technologies are conceivable within the scope of the invention.

The measurement device also comprises a testing system comprising the stimulation device 9, able to emit an optical signal in the direction of the measurement fiber 7. This signal is transmitted through the portion 8a of the optical fiber 8 which extends from the stimulation device 9 to the test body 5. The measurement device also comprises the acquisition system 10, able to detect an optical signal coming from the measurement fiber 7. This signal is transmitted through the portion 8b of the optical fiber 8 that extends from the test body 5 to the acquisition device 10. The use of an optical fiber 8 greatly reduces the loss of information, and the optical fiber 8 can withstand electromagnetic environments such as lightning, high voltage cables, etc. It is therefore possible to position the acquisition device 10 several kilometers away (up to 15 kilometers).

Alternatively, a single integrated system may implement both the stimulation and the acquisition. Thus, it is not the optical signal transmitted through the optical fiber 8 that is detected, but the reflection of that signal.

The measurement device also comprises the computing unit 11. The computing unit 11 is for example implemented in a printed circuit of a programmable machine such as a computer, or other, and is able to process the signals detected by the acquisition system 10, as will be described in more derail below.

The computing unit 11 can process information, such as data stored in a memory 12, corresponding to signals detected by the acquisition device 10, in order to determine a deformation undergone by the structure 1 at portion 71 of the measurement fiber 7. If portion 71 of the measurement fiber 7 is fixed in the test body 5, the deformation corresponds to an average deformation along the axis of portion 71 of the measurement fiber 7.

If the dimensions of the test body 5 are low compared to those of the structure (which will typically be the case in civil engineering, the dimension of the test body 5 being for example between about 0.5 cm and 10 cm, and the size of the structure being at least equal to a meter, sometimes more than 10 or even 100 meters), a local measurement is obtained at the scale of the structure 1.

The computing unit 11 is also able to determine shrinkage deformations in the structure 1 at the location of portion 71 of the measurement fiber 7, based on deformation in the optical fiber 8. The computing unit 11 may have a table stored in memory containing the mechanical properties of the test body 5. These properties will typically include the elastic modulus or moduli for each of the main directions of the material, or one or more Poisson's ratios in this reference system, where appropriate according to certain numbers of external parameters (temperature, etc.). Suitable equations are programmed into the computing unit 11.

In this example where there is a single measurement fiber in the uniaxial test body 5, the measured deformation may be associated with the average state of tension (traction or compression) along the direction of the test body 5.

Figure 5:
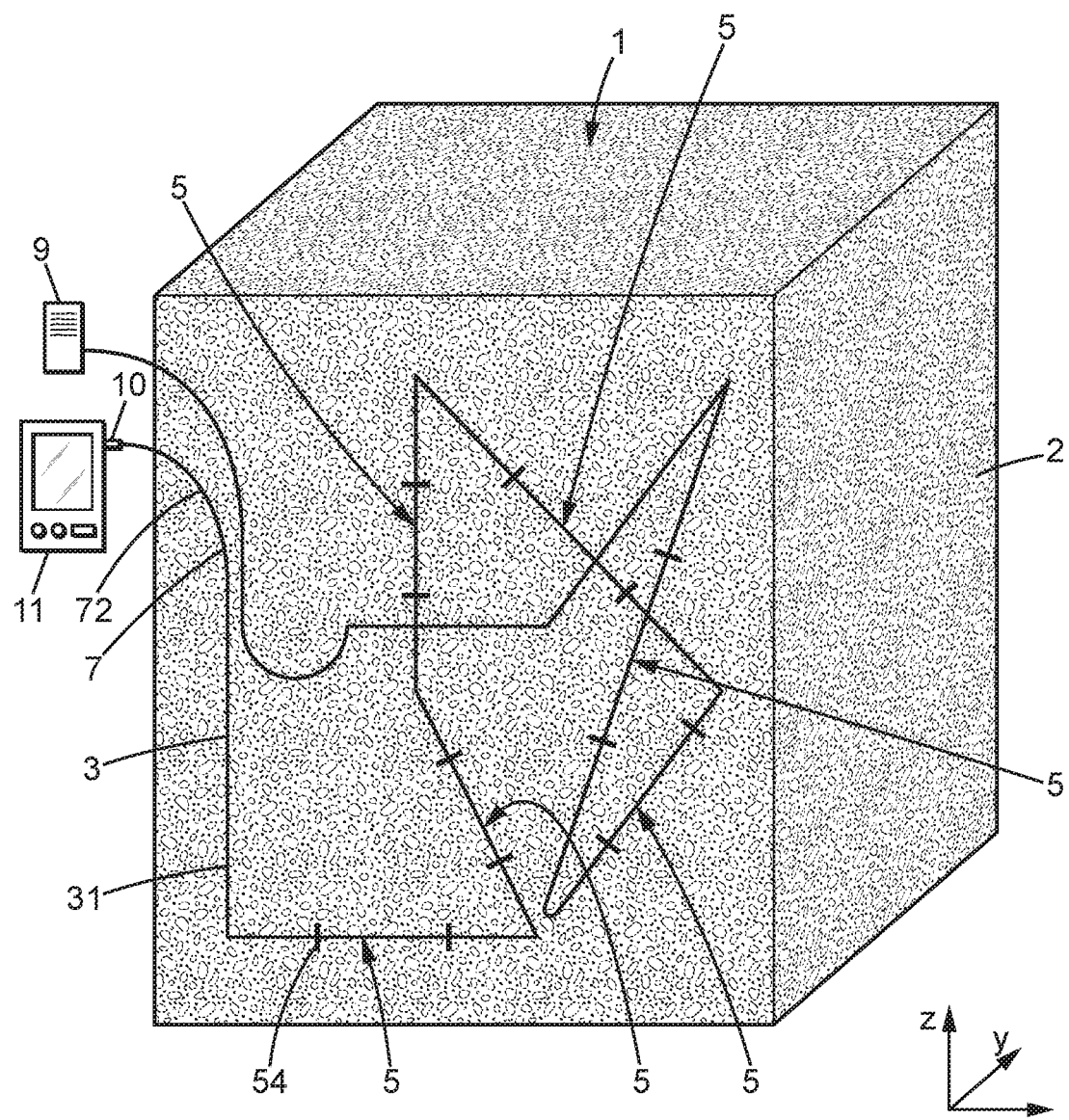
FIG. 5 is a view showing the support of FIG. 4 positioned in a portion of the structure.

In mechanics, space is considered to have six dimensions. These are the three dimensions of the major axes as well as the three dimensions associated with pairs of these axes. Thus, as shown in FIG. 5, the measurement device may comprise a plurality of test bodies 5, preferably six test bodies 5.

The measurement device further comprises a support 3. The support 3 is composed of a plurality of uniaxial legs 31 extending between a first end 31a and a second end 31b. The distance between the first end 31a and second end 31b of one of the legs 31 is for example comprised between 10 and 100 millimeters and preferably between 20 and 60 millimeters. Each of the legs 31 may be substantially cylindrical and have, for example, a diameter of about 4 to 12 millimeters. Each of the legs 31 may be made of a flexible material, preferably plastic and which may have a rigidity comprised between 2 and 5 gigapascals. The surface of each of the legs 31 then has irregular projections that are inclined relative to the axis of the leg or irregular recesses in order to encourage adherence of the legs 31 within the structure 1.

Figure 3:
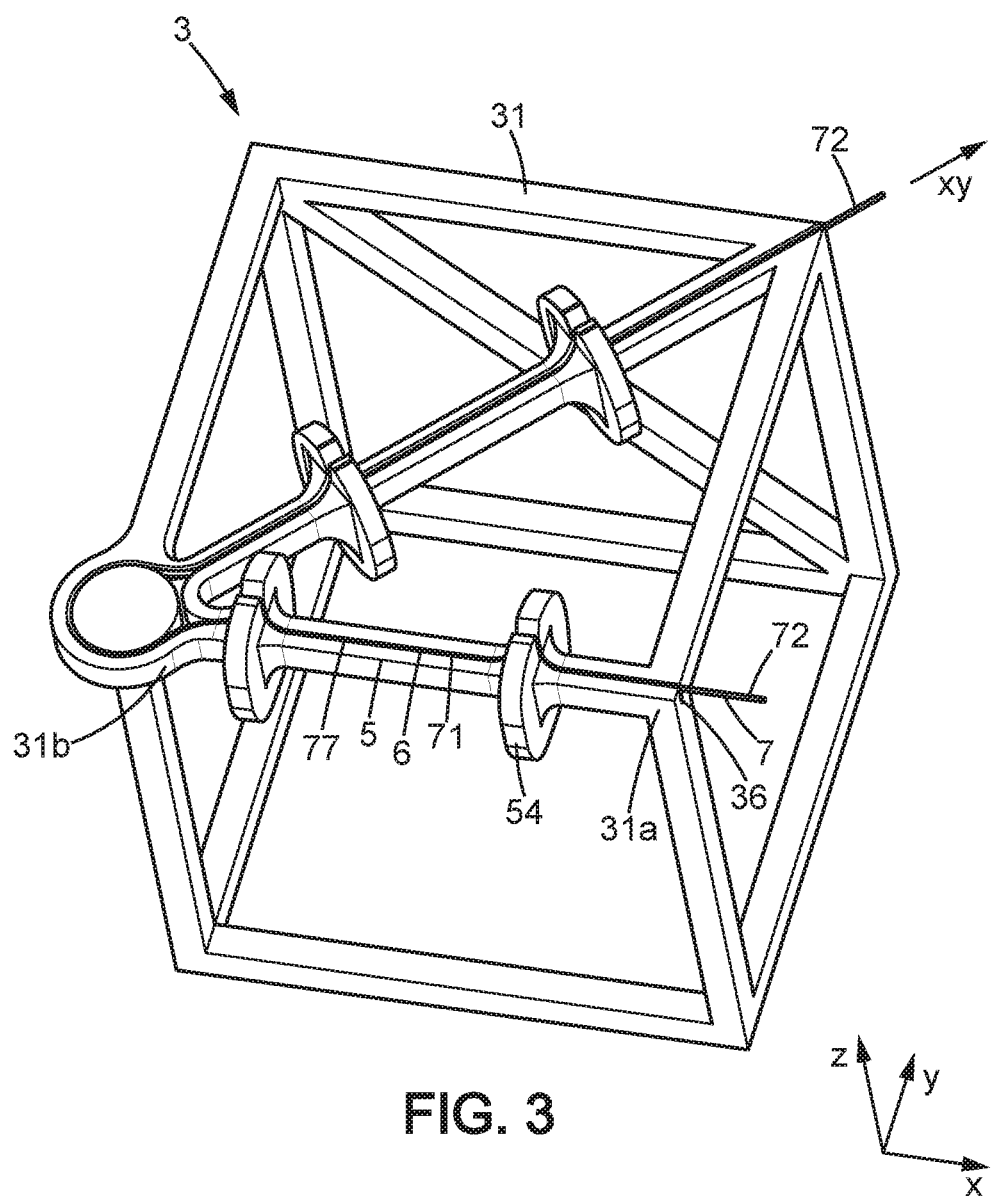
FIG. 3 is a perspective view of a cube-shaped support comprising fourteen legs of which two are equipped with a test body with a measurement fiber.

Each of the legs 31 of the support is connected to at least one other leg 31 of the support 3 by one of the first and second ends 31a and 31b. As shown in FIG. 3, the plurality of interconnected legs 31 gives the support 3 a general cube shape.

The cubic shape of the support 3 further allows minimizing the intrusiveness of the measurement device in order to avoid creating a concentration of stresses that could cause cracking of the structure 1 and to obtain relevant measurements. The cubic shape of the support 3 also facilitates inclusion of the support 3 within the structure 1 during the step of pouring the structure, in order to have good control over the orientation of the support 3.

The support 3 comprises a minimum of six legs 31 and a maximum of fifteen legs 31.

At least one of the legs 31 of the support 3 comprises a test body 5.

Optionally, at least three legs 31 among the plurality of legs 31 of the support 3, extending in independent directions, comprise three test bodies 5. The three legs 31 extend respectively along a first direction X, along a second Y direction perpendicular to the first direction X, and along a third direction Z perpendicular to the first direction X and second direction Y. Each of these legs 31 comprises at most one test body 5.

By performing three independent measurements, one can directly determine three components of the strain tensor in the structure 1 at the support 3.

The sum of these three measurements tracks the strain tensor, which gives access to the volume shrinkage.

Optionally, at least three additional legs 31 among the plurality of legs 31 of the support 3 comprise three additional test bodies 5. The structure then comprises six test bodies 5. The three additional legs 31 respectively extend along a fourth direction XY which lies within a first plane (X;Y) comprising the first direction X and second direction Y, along a fifth direction YZ which lies within a second plane (Y;Z) comprising the second direction Y and third direction Z, and along a sixth direction XZ which lies within a third plane (X;Z) comprising the first direction and third direction Z. The support 3 comprising these six test bodies 5 is three-dimensional.

Figure 4:
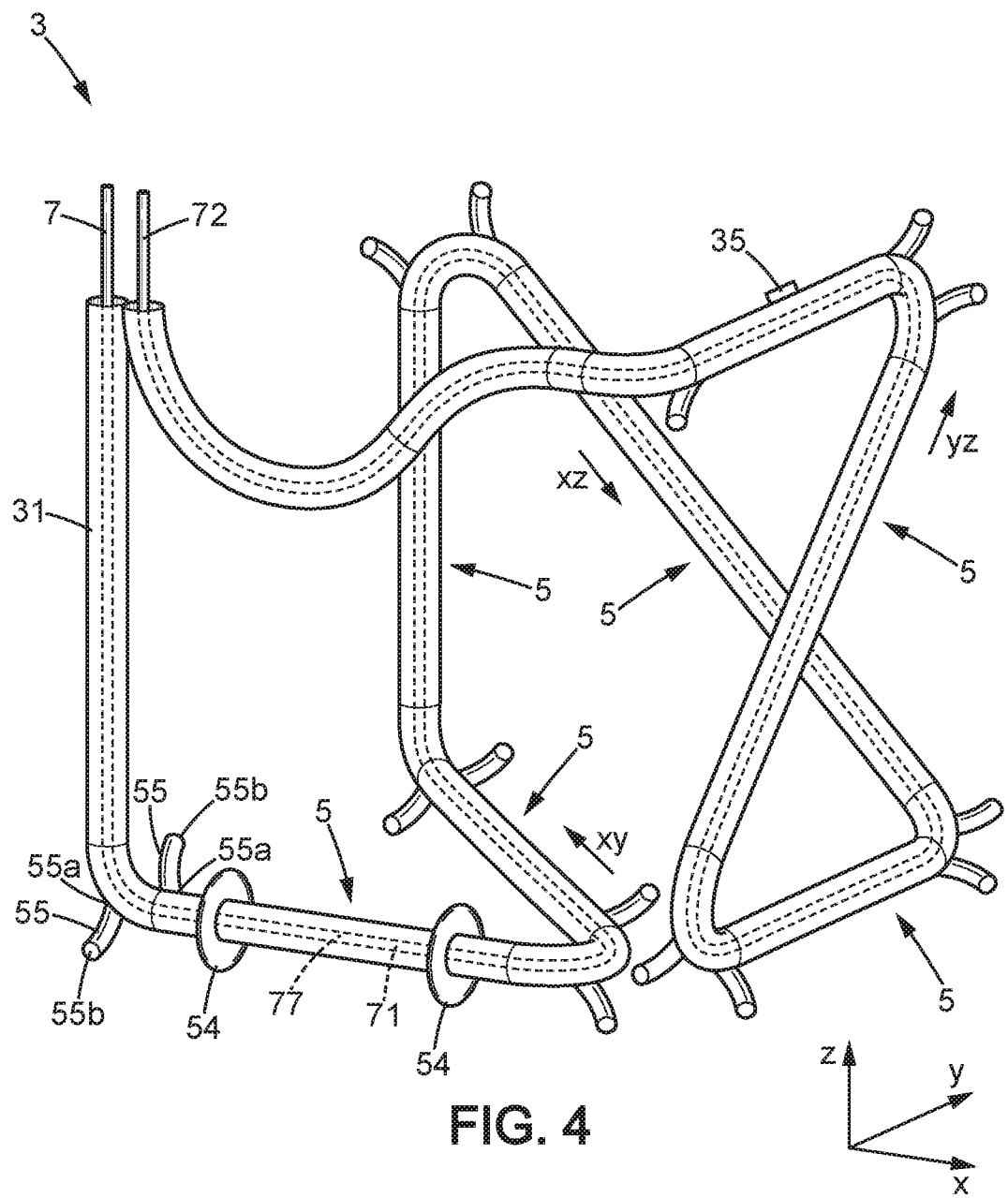
FIG. 4 is a perspective view of a cube-shaped support comprising nine legs of which six are equipped with a test body with a measurement fiber.

By obtaining six independent measurements, as shown in FIG. 4, one can have six data items which allow determining the six components of the strain tensor in the structure 1 at the placement location of the support 3.

In addition, one of the legs of the plurality of legs 31 may comprise a temperature sensor 35. The temperature sensor 35 may be carried by the measurement fiber 7. The temperature can be taken into account in a measurement correction related to the sensitivity of the deformation sensors (strain gauge, Bragg grating, or Fabry-Perot cavity) at that temperature.

Each leg 31 may be pierced by at least one channel 36 which extends longitudinally between the first end 31a and second end 31b of the leg 31. When a leg 31 is equipped with a test body 5, the channel 36 of the leg 31 and the channel 6 of the test body 5 are at least partially coincident.

The at least one portion 71 of the measurement fiber 7 extends within the channel 36. The at least one portion 71 of the measurement fiber 7 is fixed to the interior of the plurality of legs 31 such that the deformations undergone by each of the legs 31 of the support 3 are transmitted to the measurement fiber 7. For example, the at least one portion 71 of the measurement fiber 7 is to the interior of the channel 36.

The measurement fiber 7 is continuous and runs through at least a portion of all the legs 31 of the support 3 to form a loop as shown in FIG. 5. The measurement fiber 7 portion entering the support 3 is thus next to the measurement fiber 7 exiting the support 3, in order to minimize the intrusive nature of the measurement device. The use of optical fiber 8 allows multiplexing the measurement fiber 7, the latter comprising a plurality of sensors (Bragg gratings, strain gauge, Fabry-Perot cavity, temperature sensors, etc.) placed along the measurement fiber 7. The measurement fiber 7 can run inside all legs 31 of the plurality of legs 31 of the support 3.

In the example shown in FIG. 4, the support 3 comprises nine legs 31, six test bodies 5, and a temperature sensor 35.

Figure 6A:
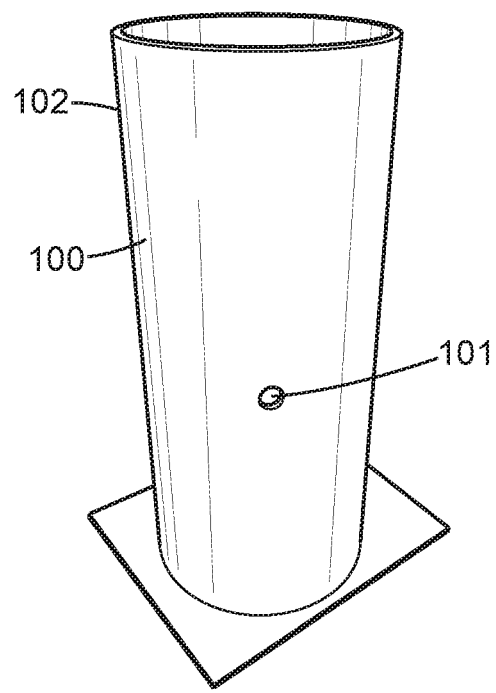
FIGS. 6a and 6b are steps for installing the measurement device inside the structure.
Figure 6B:
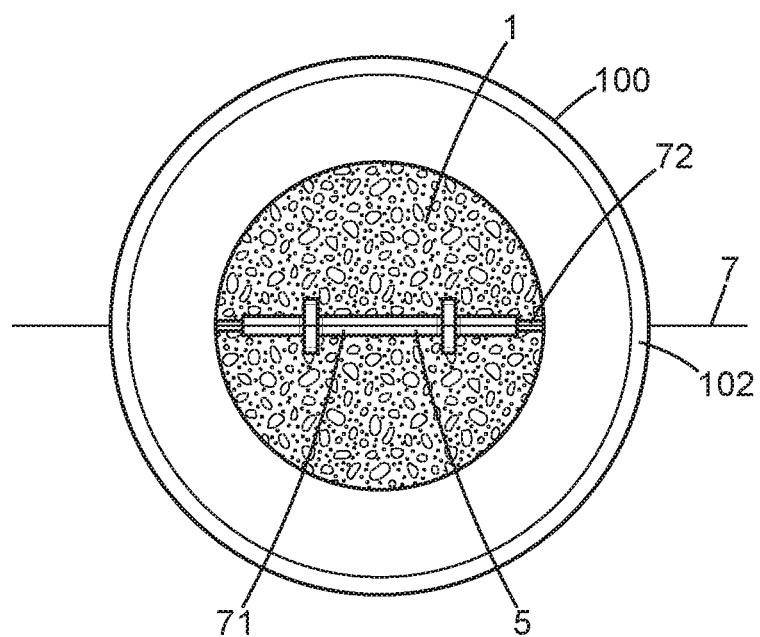

The measurement device just described can therefore be implemented and used in the following manner: A mold 100, comprising one or two openings 101 in its wall 102, is partially filled with the component material of the structure 1 (FIG. 6a). The material is in a liquid or viscous state. The support 3 is placed in the mold 100 on the surface of the material and oriented in the desired direction (FIG. 6b). The two portions 72 of the measurement fiber 7 are threaded through one or both openings 101 and respectively connected to the stimulation device 9 and to the acquisition system 10. Then, the support 3 is embedded in the component material of the structure 1 which is in liquid form.

Once the solidification phase begins, the stimulation device 9, for example a laser, emits an optical signal into the optical fiber 8. The optical signal is propagated along the optical fiber 8 and through the measurement fiber 7, where it is modulated according to the deformations undergone by the measurement fiber 7. The modulated optical signal is transmitted along the optical fiber 8b to the acquisition system 10, where the signal is detected and then stored in the memory 12 of the computing unit. The computing unit processes the information to determine a deformation in the structure 1 at the support 3.

This test can be repeated over time, for example periodically. The computing unit is thus able to monitor a change over time in the local endogenous deformation, starting at the earliest age of the structure 1. The computing unit can be coupled to warning means for the case where a comparison of the detected deformations with a predetermined deformation is unsatisfactory.

It is thus possible to map strain tensors, and of course to monitor the evolution in these deformations over time during or after setting of the structure 1, as in the case of a single localized sensor.

The invention claimed is:

1. A device for measuring endogenous deformations of a structure during the transition of said structure from a liquid phase to a solid phase, the device comprising:
  at least one uniaxial test body extending between a first end and a second end, the at least one test body being suitable for embedding in the structure and being made of homogeneous flexible material with known mechanical properties,
  a deformation measurement fiber attached to inside the at least one test body, such that deformations of the at least one test body are transmitted to the measurement fiber,
  a system connected to the measurement fiber and suitable for detecting signals from the measurement fiber that are representative of the deformations of the measurement fiber and for determining the endogenous deformations from at least one of the detected signals and from the known mechanical properties of the materials of the test body,
a support with uniaxial legs, each leg being connected to at least one other leg and the legs defining between them an internal space of substantially cubic shape,
wherein the measurement fiber is continuous and runs through each of the legs;
at least one of the legs of the support comprises one of the at least one test body; and
the at least one test body having a rigidity comprised between 2 and 5 gigapascals.

2. The device according to claim 1, further comprising a support with uniaxial legs,
wherein the measurement fiber is fixed inside the plurality of legs such that the deformations undergone by the plurality of legs are transmitted to the measurement fiber,
the plurality of legs having a rigidity comprised between 2 and 5 gigapascals.

3. The device according to claim 1, wherein the measurement fiber is an optical measurement fiber.

4. The device according to claim 1, wherein the at least one test body comprises a channel extending between the first end and the second end, at least a portion of the measurement fiber being glued to the interior of said channel.

5. The device according to claim 1, wherein the test body is overmolded on at least a portion of the measurement fiber.

6. The device according to claim 1, wherein the at least one test body comprises at least one lug extending radially relative to said test body, between a first end integral to said test body and a second free end.

7. The device according to claim 1, wherein the measurement fiber is equipped with a strain gauge, a Bragg grating, or Fabry-Perot cavity.

8. The device according to claim 1, wherein said device comprises at least three test bodies arranged in three distinct directions, a first test body extending in a first direction, a second test body extending in a second direction perpendicular to the first direction, and a third test body extending in a third direction perpendicular to the first direction and the second direction.

9. The device according to claim 8, wherein said device comprises a fourth test body extending in a fourth direction that lies within a first plane comprising the first direction and the second direction,
and/or a fifth test body extending in a fifth direction that lies within a second plane comprising the second direction and third direction,
and/or a sixth test body extending in a sixth direction that lies within a third plane comprising the first direction and third direction.

10. The device according to claim 9, wherein at least three legs among the legs of the support respectively comprise the first test body, the second test body, and the third test body.

11. The device according to claim 10 wherein at least one leg of the support comprises the fourth test body,
and/or wherein at least one leg of the support comprises the fifth test body,
and/or wherein at least one leg of the support comprises the sixth test body,
each of the legs of the support comprising at most one test body.

12. The device according to claim 1, wherein at least one leg among the legs of the support is equipped with a temperature sensor carried by the measurement fiber.

13. The device according to claim 1, wherein the support comprises at least seven legs and wherein the measurement fiber which runs through each of said legs forms a loop.

14. A device for measuring endogenous deformations of a structure during the transition of said structure from a liquid phase to a solid phase, the device comprising:
test bodies, each uniaxial and extending between a first end and a second end, each being suitable for embedding in the structure and being made of homogeneous flexible material with known mechanical properties,
a three-dimensional support comprising a plurality of uniaxial legs, each of the test bodies being part of a respective one of the uniaxial legs of the three-dimensional support,
a deformation measurement fiber attached to inside the at least one test body, such that deformations of the test bodies are transmitted to the measurement fiber, the measurement fiber extending inside channels respectively included in the legs and being fixed inside the plurality of legs such that the deformations undergone by the plurality of legs are transmitted to the measurement fiber,
a system connected to the measurement fiber and suitable for detecting signals from the measurement fiber that are representative of the deformations of the measurement fiber and for determining the endogenous deformations from at least one of the detected signals and from the known mechanical properties of the materials of the test body,
each of the test bodies having a rigidity comprised between 2 and 5 gigapascals.

15. A method for measuring endogenous deformations of a structure during the transition of said structure from a liquid phase to a solid phase, said method comprising:
installing a measurement device for measuring the endogenous deformations of the structure during the transition of said structure from the liquid phase to the solid phase, the measurement device comprising:
at least one uniaxial test body extending between a first end and a second end, said at least one test body being suitable for embedding in the structure and being made of homogeneous flexible material with known mechanical properties, the at least one test body having a rigidity comprised between 2 and 5 gigapascals,
a deformation measurement fiber attached to inside the at least one test body, such that deformations of the at least one test body are transmitted to the measurement fiber,
a system connected to the measurement fiber and suitable for detecting signals from the measurement fiber that are representative of the deformations of the measurement fiber and for determining the endogenous deformations from at least one of the detected signals and from the known mechanical properties of the materials of the at least one test body,
a support with uniaxial legs, each leg being connected to at least one other leg and said legs defining between them an internal space of substantially cubic shape, the measurement fiber being continuous and running internally through each of the legs via a leg channel, at least one of the legs of the support comprising one of the at least one test body,
pouring the liquid-phase structure around the measurement device, and collecting measurements on the system from the measurement device during the solidification phase of the structure.

* * * * *